Figure 1:
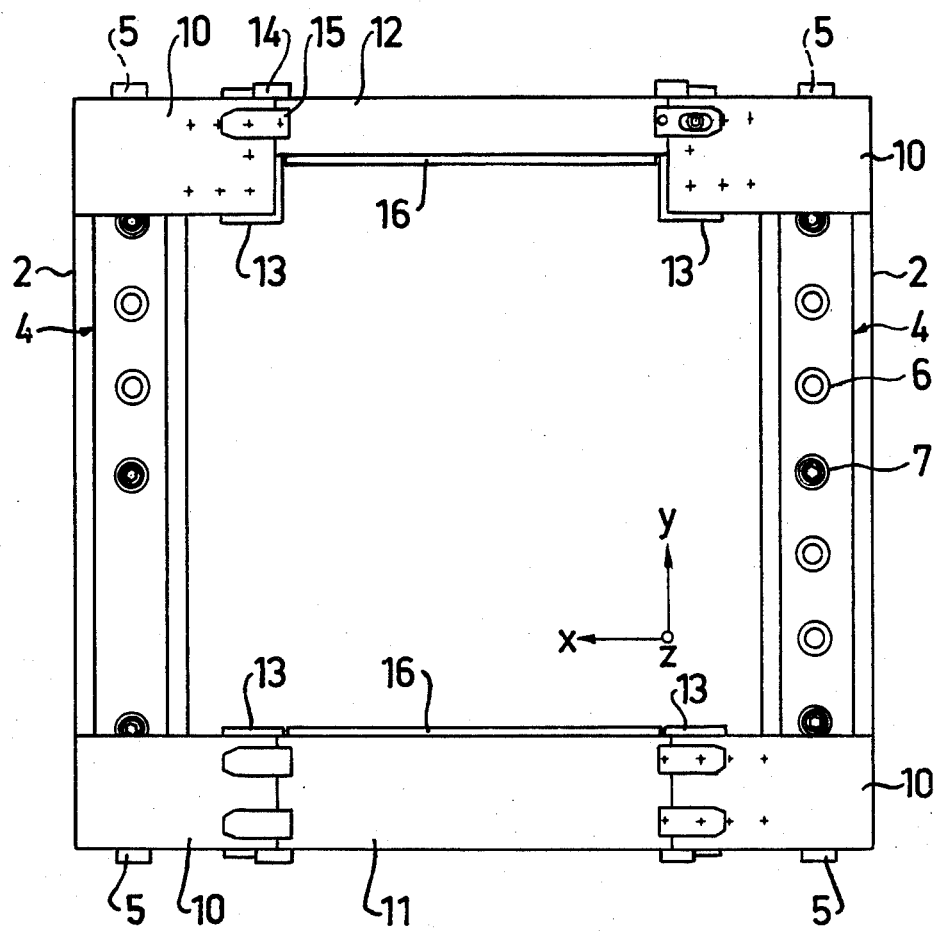

United States Patent [19]

Ramsbro

[11] Patent Number: 4,656,326
[45] Date of Patent: Apr. 7, 1987

[54] REFERENCE SYSTEM AT A WIRE ELECTRIC DISCHARGE MACHINE

[75] Inventor: Börje K. H. Ramsbro, Djursholm, Sweden

[73] Assignee: 3R Management AB, Vallingby, Sweden

[21] Appl. No.: 708,820

[22] Filed: Mar. 6, 1985

[30] Foreign Application Priority Data

Mar. 23, 1984 [SE] Sweden .................................. 8401635

[51] Int. Cl.$^4$ ........................... B23H 7/02; B23Q 3/02
[52] U.S. Cl. ................................. 219/69 R; 219/69 W; 269/309
[58] Field of Search ...................... 219/68, 69 E, 69 R, 219/69 M, 69 W; 269/58, 303, 304, 305, 306, 82, 81, 287, 309

[56] References Cited

U.S. PATENT DOCUMENTS

| | | | |
|---|---|---|---|
| 515,026 | 2/1894 | Schleicher | 269/305 |
| 1,674,291 | 6/1928 | Malone | 269/137 |
| 3,541,291 | 11/1970 | Johanson | 219/69 R |
| 3,572,680 | 3/1971 | Neff | 269/82 |
| 3,638,933 | 2/1972 | Burnette et al. | 269/309 |
| 4,013,280 | 3/1977 | Chitayat et al. | 269/60 |
| 4,227,064 | 10/1980 | Muegge et al. | 269/58 |
| 4,353,170 | 10/1982 | Jordan | 269/58 |
| 4,463,241 | 7/1984 | Smith | 269/303 |
| 4,518,155 | 5/1985 | Lehmann | 269/309 |
| 4,521,661 | 6/1985 | Inoue | 219/69 M |

FOREIGN PATENT DOCUMENTS

| | | | |
|---|---|---|---|
| 37251 | 10/1981 | European Pat. Off. | 269/81 |
| 1502859 | 3/1970 | Fed. Rep. of Germany . | |
| 1602912 | 11/1971 | Fed. Rep. of Germany . | |
| 2408350 | 8/1975 | Fed. Rep. of Germany . | |
| 3127584 | 7/1982 | Fed. Rep. of Germany ... | 219/69 G |
| WO83/00302 | 2/1983 | PCT Int'l Appl. | 269/58 |
| 2135916 | 9/1984 | United Kingdom | 269/60 |

Primary Examiner—Roy N. Envall, Jr.
Assistant Examiner—Geoffrey S. Evans
Attorney, Agent, or Firm—Holman & Stern

[57] ABSTRACT

Reference system for fixing a workpiece to a wire electric discharge machine with work table. The system consists of a base reference system attached to the work table (1) and forming a base reference surface (3) which defines a plane located on a level above the work table (1) but beneath the vertical working range of the machine and comprising two stop means (4, 5) to form the references defining the x- and y-directions of the plane. Moreover, a secondary reference system is included in the system which consists of fixed separate reference parts (10-12, 17-21) which at mounting on the base reference system, directly or as assembled outside the machine, define a fixed, desired and predetermined level within the vertical working range of the machine.

9 Claims, 3 Drawing Figures

REFERENCE SYSTEM AT A WIRE ELECTRIC DISCHARGE MACHINE

This invention relates to a reference system for fixing a workpiece to a wire electric discharge machine.

Such systems known today have a plurality of drawbacks, as will appear below.

The principle of wire electric discharge machining by which it is possible to machine hard metals with a great accuracy and a great geometric freeness of form, has opened new possibilities in tool manufacture. Also a rapid production of prototype parts and generation of small geometric systems in manufacture of electrodes for sink electric discharge machining are characteristic properties associated with wire electric discharge machining. The application range of this is therefore primarily manufacture of single pieces of a very varying shape and weight, mostly with very strict demands on the working tolerances. The demands on flexibility, accuracy and rapidity in rigging and setting workpieces in the wire electric discharge machine are therefore very high. The wire electric discharge machining process is moreover characterized by high capital costs and a relatively low machining velocity. As the machine is very well suited for operation without manning it is natural to reduce the costs in manufacture by keeping the degree of utilization of the machine as high as possible. However, this high degree of utilization requires that the rigging time can be minimized. Positioning of a workpiece in a wire electric discharge machine is today the main problem in rigging, especially considering the varying dimensions of these workpieces and the demands on tolerance often made.

Even if the rigging means, which according to a predetermined choice and adjustment on the work table of the machine into position are a fixed reference system for fixing the workpiece, already exist on the market, there is previously no equipment which enables utilization of the entire load-carrying and geometric capacity of the machine by the aid of a unitary base reference system for positioning and retaining the workpiece. Previously known rigging or bracket systems must be chosen in dependence of the dimensions of the workpiece and are adjusted into position in the machine to form a unitary reference system for the positioning of the workpiece. Therefore it has not been possible to utilize the whole range of application of the machine without expensive new rigging and alignment in the machine to new reference systems for new workpieces.

By the present invention as it is set forth in the characterizing portions of the claims and using a base reference system and a secondary reference system, each form of workpiece can be positioned with a very high accuracy and a comparatively slight time contribution.

Figure 2:
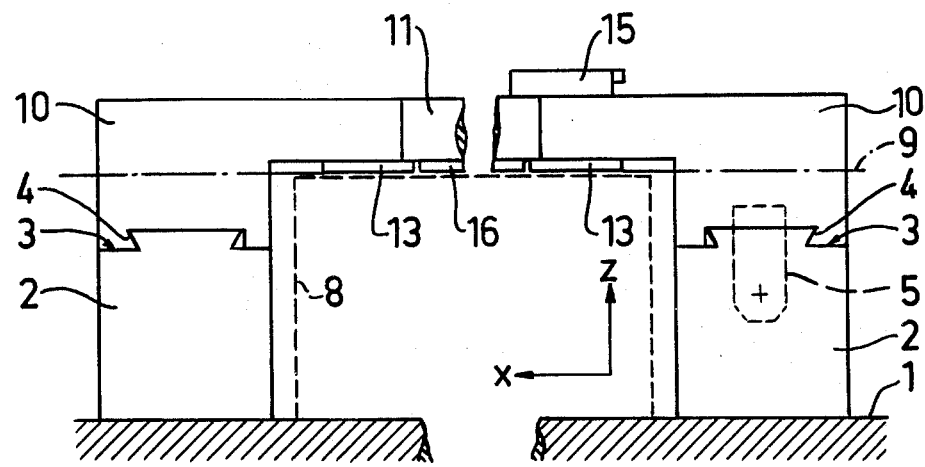
Figure 3:
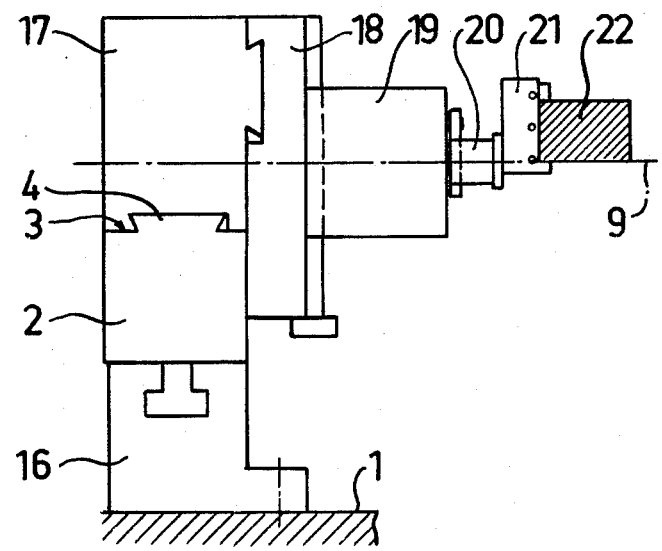

The invention will be described more in detail in the form of examples with reference to the drawing, in which FIG. 1 is a plan view of a base reference system with a secondary reference system intended to be affixed to the work table of the machine, FIG. 2 is a lateral view of the systems and FIG. 3 is another embodiment of the base reference system and the secondary reference system.

In FIGS. 2 and 3 1 denotes the work table of the machine. According to the illustrative examples shown the base reference system is put up thereon. It consists of two bars 2 parallel to each other. The bars 2 are clamped to the work table 1 and form a fixed base reference surface 3 well defined in space. The bars having a great carrying capacity show dovetail profiles 4 on the base reference surface 3. Further, in the example shown (see FIG. 1) each bar is provided with a shoulder 5 at one end (such a shoulder is marked with dashed lines in FIG. 2). The dovetail profile 4 and the shoulder 5 form references of the x and y-directions on the base reference surface 3. In FIG. 1 holes 6 made in the bars 2 are shown for clamping the bars to the work table by means of bolts 7 in a way known per se. The base reference surface 3 is arranged on a definite level over the work table and defines in this way the base reference in the z-direction. The base reference system is formed so that no geometric limitation or weight limitation of the capacity of the machine is present. Moreover, the base reference system is placed outside the geometric working range of the machine and under the working level of the lower thread guide of the machine, the O-level, indicated in FIGS. 2 and 3 with the dash-dotted line 9.

A secondary reference system can consist of reference parts 10 coacting with the relative bar 2. Each such reference part 10 rests on the base reference surface 3 and has grooves coating wiith the dovetail profiles 4. The position of the reference part 10 in the x-direction is therefore unambiguously defined. The shoulder 5 is used to define the position of the reference part 10 in the y-direction. By the aid of means known per se the reference parts 10 can be locked to the bars 2 in a definite position. In FIG. 1 four reference parts 10 are shown, a bridge 11 being arranged to extend between a first pair of such reference parts and another more narrow bridge extending between the other pair of reference parts 10. The position of the relative bridge 11, 12 in vertical direction is defined by reference pieces 13 arranged on the undersides of the reference parts 10. The positioning of the relative bridge in the y-direction is decided by shoulders 14 and the relative bridge is locked in its position by the aid of locking means 15. In the example shown in FIGS. 1 and 2 the bridges 11 and 12 also have reference pieces 16. Furthermore, in the example shown the lower plane of the reference pieces 13 and 16 define the previously mentioned O-level 9.

By selection of fixed distance members (reference parts 10) or by means of adjustable members, which can be measured outside the machine, the secondary reference system can be formed exactly, which positions the workpiece unambiguously with a very great accuracy irrespective of its shape. It should be understood that the workpiece, thus, in the examples shown in FIGS. 1 and 2 can be fixed in the exact position by the aid of further distance members and fastening means.

Thus, with a knowledge of the base reference system the secondary reference system can be built outside the machine for positioning and retaining the workpiece. By means of fixed extra details or by adjustment of extra details, which can be measured outside the machine and form together the secondary reference system, it is possible, thus to position every type of workpiece within the capacity range of the machine and in the vertical working range thereof.

Thus, in FIG. 3 a base reference system in the form of a bar 2 and a distance support 16 carrying this are shown, on which base reference system the secondary reference system in the form of extra details 17–21 adjustable to each other and outside the machine is arranged, positioning the workpiece 22 in the intended position. The parts 17–21 can be provided with guides (dovetails and corresponding dovetail grooves) arranged in suitable manner for the intended function and locking means of embodiments known per se. The extra details have reference surfaces and reference shoulders for exact definition of the x-, y-, and z-directions for an accurate relation to the base reference system exactly fixed in the machine. As indicated in FIG. 3 the base reference system can thus consist of merely one bar with a possible distance support and the secondary reference system of extra details afixed to this separate bar.

The base reference system in the x-direction is also base angle reference in the ground plane, whereby it is possible to fix the horizontal angular position of each workpiece in a secondary reference system by means of suitable extra details.

The members included in the base reference system and the secondary reference system can be given other embodiments than those shown here, within the scope of the invention, provided the basic idea of the invention is maintained.

What I claim is:

1. A reference system for fixing a workpiece to a wire electric discharge machine, said electric discharge machine including a work table and a vertical working range, said reference system comprising base reference elements defining a base reference system unambiguously related to a coordinate system of the machine and mounted on the work table thereby forming a base reference surface, said base reference surface defining a plane located on a level above the work table below the vertical working range, and comprising positive stops to form references in the x and y coordinate directions of the plane, said reference system further comprising a secondary reference system comprising fixed separate reference parts for mounting on the base reference elements to define a fixed predetermined level within the vertical working range.

2. A reference system according to claim 1 wherein the base reference system consists of at least two bars each provided with a dovetail profile projecting from the base reference surface and running along the bar, said base reference surface extending parallel to a work surface of said work table.

3. A reference system according to claim 1 wherein the base reference system consists of two parallel bars each provided with dovetail profiles projecting from the horizontally extending base reference surface and running along the bar.

4. A reference system according to claim 2 wherein the secondary reference system consists of at least one reference member fixable to at least one of said bars and having a groove coacting with the dovetail profile.

5. A reference system according to claim 4 wherein the reference member consists of two parts attachable to the respective bar, and of a bridge extending between the bars and fixable to the reference parts.

6. A reference system according to claim 5 wherein at least the bridge defines the plane of the lowermost level within said vertical working range by means of supplementary parts.

7. A reference system according to claim 4 wherein one of two stops is formed by dovetail grooves and the other one of the stops is formed by a shoulder fixable to at least one of the respective bars.

8. A reference system according to claim 5 wherein one of two stops is formed by the dovetail grooves and the other one of the stops is formed by a shoulder fixable to at least one of the respective bar.

9. A reference system according to claim 6 wherein one of two stops is formed by the dovetail grooves and the other one of the stops is formed by a shoulder fixable to at least one of the respective bars.

* * * * *